(12) United States Patent
Shih et al.

(10) Patent No.: US 11,693,186 B2
(45) Date of Patent: Jul. 4, 2023

(54) TWO-DIMENSIONAL GRATING COUPLER AND METHODS OF MAKING SAME

(71) Applicant: Taiwan Semiconductor Manufacturing Co., Ltd., Hsin-Chu (TW)

(72) Inventors: Chih-Tsung Shih, Hsinchu (TW); Chewn-Pu Jou, Hsinchu (TW); Stefan Rusu, Sunnyvale, CA (US); Felix Ying-Kit Tsui, Cupertino, CA (US); Lan-Chou Cho, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 78 days.

(21) Appl. No.: 17/220,724

(22) Filed: Apr. 1, 2021

(65) Prior Publication Data
US 2022/0317379 A1 Oct. 6, 2022

(51) Int. Cl.
*G02B 6/34* (2006.01)
*G02B 6/30* (2006.01)

(52) U.S. Cl.
CPC .............. *G02B 6/34* (2013.01); *G02B 6/305* (2013.01)

(58) Field of Classification Search
CPC .................................. G02B 6/34; G02B 6/305
See application file for complete search history.

(56) References Cited

U.S. PATENT DOCUMENTS

2010/0119229 A1* 5/2010 Roelkens ........... G02B 6/12007
398/79
2017/0138789 A1* 5/2017 Ivanov .................. G02B 6/305

\* cited by examiner

*Primary Examiner* — Michael P Mooney
(74) *Attorney, Agent, or Firm* — Duane Morris LLP

(57) ABSTRACT

Disclosed are apparatus and methods for optical coupling. In one example, a described apparatus includes: a planar layer; a grating region comprising an array of scattering elements arranged in the planar layer to form a two-dimensional grating; a first taper structure formed in the planar layer connecting a first side of the grating region to a first waveguide, wherein a shape of the first taper structure is a first triangle that is asymmetric about any line perpendicular to the first side of the grating region in the planar layer; and a second taper structure formed in the planar layer connecting a second side of the grating region to a second waveguide, wherein a shape of the second taper structure is a second triangle that is asymmetric about any line perpendicular to the second side of the grating region in the planar layer, wherein the first side and the second side are substantially perpendicular to each other.

20 Claims, 14 Drawing Sheets

500-1

500-2

TWO-DIMENSIONAL GRATING COUPLER AND METHODS OF MAKING SAME

BACKGROUND

Optical gratings are frequently used to couple light between a waveguide and an optical fiber. Due to extremely different dimensions of the waveguide and the optical fiber, direct coupling would incur tremendous light loss. An incoming light to a waveguide is usually in an unknown and arbitrary polarization state, such that a two-dimensional (2D) grating coupler is needed to provide polarization light in either transverse magnetic (TM) or transverse magnetic (TE) polarization mode from the optical fiber to the waveguide.

A conventional 2D grating coupler includes two symmetric taper structures coupled to a 2D grating. To reduce power loss and to improve coupling efficiency of the conventional 2D grating coupler, complicated designs of the 2D grating have been proposed to find proper output field to match a given taper design of the 2D grating coupler, which takes lots of hardware resources and simulation time.

As such, there exists a need to develop a method and apparatus for efficient optical coupling using novel taper designs.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of illustration.

DETAILED DESCRIPTION OF EXEMPLARY EMBODIMENTS

Figure 1:
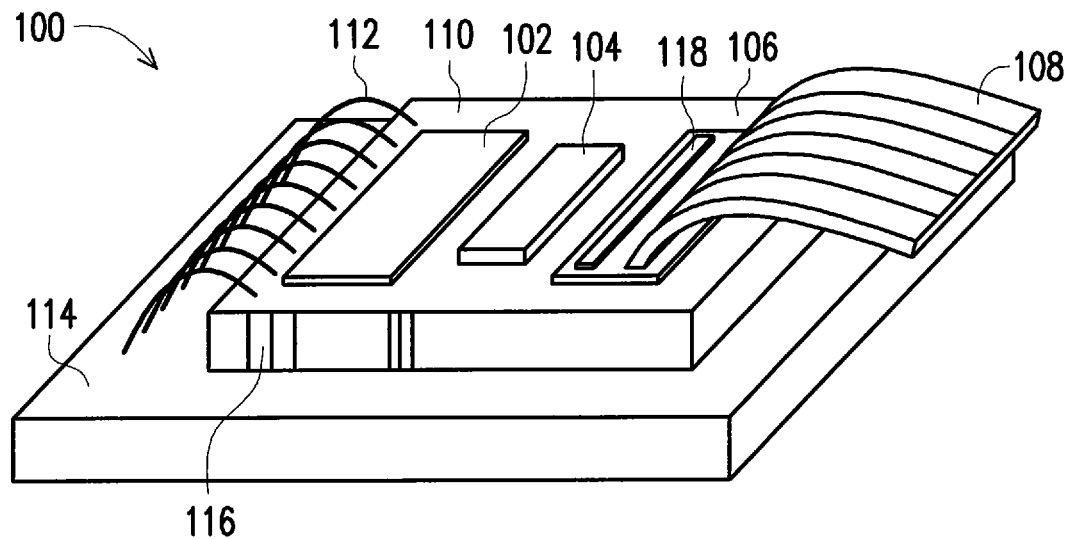
FIG. 1 illustrates an exemplary block diagram of a device, in accordance with some embodiments of present disclosure.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

A waveguide surrounded by a cladding layer may confine light based on refractive index contrast between the materials in the waveguide and the cladding layer. For example, a silicon waveguide with sub-micron dimension can confine infrared light (with a wavelength larger than about 700 nanometers or 700 nm) due to its strong refractive index contrast to its silicon oxide cladding layer, wherein the refractive indices for silicon and silicon oxide are about 3.47 and 1.45, respectively. To receive or transmit light signals, light needs to be coupled between a waveguide and an optical fiber. While an outgoing light from a silicon waveguide is usually in transverse magnetic (TE) mode and can be vertically coupled to a fiber using single polarization grating coupler, an incoming light to a silicon waveguide is usually in an unknown and arbitrary polarization state, such that a polarization splitting grating coupler (PSGC) is needed to provide polarization light in either transverse magnetic (TM) or transverse magnetic (TE) polarization mode from the optical fiber to the waveguide. In one embodiment, a PSGC may be a two-dimensional (2D) grating coupler formed by two single polarization grating couplers nearly perpendicular to each other. Each single polarization grating coupler has a taper structure coupled to a common 2D grating region, which includes grating lines with scattering elements at the intersection of grating lines. Different designs of the taper structures are disclosed to reduce power loss and improve light coupling efficiency from the optical fiber to the 2D grating coupler.

In one embodiment, beam propagation is simulated as input light to the 2D grating coupler based on a plane wave expansion method, to determine a wavelength range for the input light based on the simulated beam propagation to minimize light power loss due to light transmission and reflection with respect to the 2D grating. At the wavelength range, shape and dimensions of the taper structures of the 2D grating coupler are adjusted to fit output light from the 2D grating. For example, gradually increasing values for the length and shift of each taper are simulated to determine an optimal taper design to minimize light power loss.

In one embodiment, shapes of the two tapers of the 2D grating coupler are two congruent triangles that are symmetric to each other about a diagonal line crossing the grating region. But the triangles are not isosceles triangles and have a shift from a vertex to a perpendicular bisector of the base side opposite the vertex. The length and shift of each triangle may be determined based on a position of an optical fiber coupled to the 2D grating and/or based on an incident angle of an incident light from the optical fiber.

FIG. 1 illustrates an exemplary block diagram of a device 100, in accordance with some embodiments of present disclosure. It is noted that the device 100 is merely an example, and is not intended to limit the present disclosure. Accordingly, it is understood that additional functional blocks may be provided in or coupled to the device 100 of FIG. 1, and that some other functional blocks may only be briefly described herein.

Referring to FIG. 1, the device 100 comprises an electronic die 102, a light source die 104, a photonic die 106, an interposer 110 and a printed circuit board (PCB) substrate 114. The electronic die 102, light source die 104 and the photonic die 106 are coupled together through input/output interfaces (not shown) on the interposer 110. In some embodiments, the interposer 110 is fabricated using silicon. In some embodiments, the interposer 110 comprises at least one of the following: interconnecting routing, through silicon via (TSV), and contact pads. In some embodiments, the interposer 110 is to integrate all components including the electronic die 102, the light source die 104, and the photonic die 106 together. In certain embodiments, each of the dies 102/104/106 are coupled to the interposer 110 using a flip-chip (C4) interconnection method. In some embodiments, high density solder microbumps are used to couple the dies 102/104/106 to the interposer 110. Further, the interposer 110 is coupled to the PCB substrate 114 through wire bonding 112 or through silicon-vias (TSV) 116 using soldering balls. The TSVs 116 can comprise electrically conductive paths that extend vertically through the interposer 110 and provide electrical connectivity between the electronic die 102 and the PCB 114. In some embodiments, the PCB substrate 114 can comprises a support structure for the device 100, and can comprise both insulating and conductive material for isolation devices as well as providing electrical contact for active devices on the photonic die 106 as well as circuits/devices on the electronic die 102 via the interposer 110. Further, the PCB substrate 114 can provide a thermally conductive path to carry away heat generated by devices and circuits in the electronic die 102 and the light source die 104.

In some embodiments, the electronic die 102 comprises circuits (not shown) including amplifiers, control circuit, digital processing circuit, etc., as well as driver circuits for controlling the light source 104 or elements in the photonic die 106. In some embodiments, the light source die 104 comprises a plurality of components (not shown), such as at least one light emitting elements (e.g., a laser or a light-emitting diode), transmission elements, modulation elements, signal processing elements, switching circuits, amplifier, input/output coupler, and light sensing/detection circuits. In some embodiments, the light source die 104 is on the photonic die 106. In some embodiments, the photonic die 106 comprises an optical fiber array 108 attached thereon, an optical interface and a plurality of fiber-to-chip grating couplers 118. In some embodiments, the plurality of fiber-to-chip grating coupler 118 is configured to couple the light source 106 and the optical fiber array 108. In some embodiments, the optical fiber array 108 comprises a plurality of optical fibers and each of them can be a single-mode or a multi-mode optical fiber. In some embodiments, the optical fiber array 108 can be epoxied on the photonic die 106.

In some embodiments, each of the plurality of fiber-to-chip grading coupler 118 enables the coupling of optical signals between the optical fiber array 108 and the light source die 102 or corresponding photodetectors on the photonic die 106. Each of the plurality of fiber-to-chip grating couplers 118 comprises a plurality of gratings and a waveguide with designs to improve coupling efficiency between the optical fiber on the corresponding waveguide, which are discussed in details below in various embodiments of the present disclosure.

During operation, optical signals received from a remote server attached on one end of the optical fiber array 108 can be coupled through the fiber-to-chip grating couplers 118 attached to the other end of the optical fiber array 108 to the corresponding photodetectors on the photonic die 106. Alternatively, optical signals received from the light source die 104 can be coupled through the fiber-to-chip grating couplers 118 to the optical fiber array 108 which can be further transmitted to the remote server. In one embodiment, the fiber-to-chip grating coupler 118 may be a two-dimensional (2D) grating coupler.

Figure 2A:
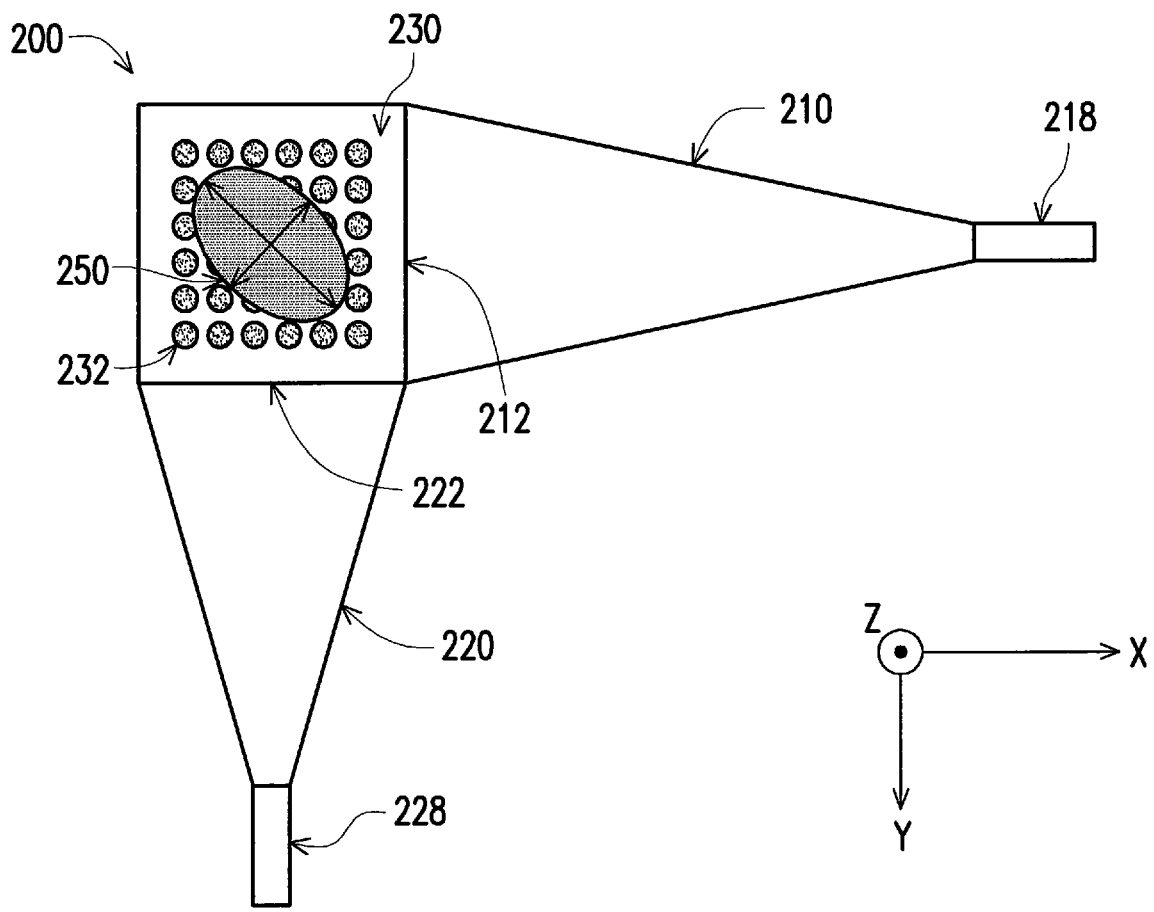
FIG. 2A illustrates a top view of an exemplary two-dimensional (2D) grating coupler, in accordance with some embodiments of the present disclosure.

FIG. 2A illustrates a top view of an exemplary 2D grating coupler 200, in accordance with some embodiments of the present disclosure. As shown in FIG. 2A, the 2D grating coupler 200 is formed by two single polarization grating couplers nearly perpendicular to each other. Each single polarization grating coupler has a respective taper structure and a shared grating region 230. The first single polarization grating coupler includes a first taper structure 210 and the shared grating region 230; and the second single polarization grating coupler includes a second taper structure 220 and the shared grating region 230. The grating region 230 comprises an array of scattering elements 232 arranged in the planar layer to form a 2D grating.

In one embodiment, the first taper structure 210, the second taper structure 220 and the shared grating region 230 are all formed in a planar layer, which may be a semiconductor layer, e.g. a silicon layer on a silicon-on-insulator (SOI) substrate. In one embodiment, the first taper structure 210 is formed in the planar layer connecting a first side 212 of the 2D grating 230 to a first waveguide 218 in the planar layer; and the second taper structure 220 is formed in the planar layer connecting a second side 222 of the 2D grating 230 to a second waveguide 228 in the planar layer. The first side 212 and the second side 222 are substantially perpendicular to each other.

Figure 2B:
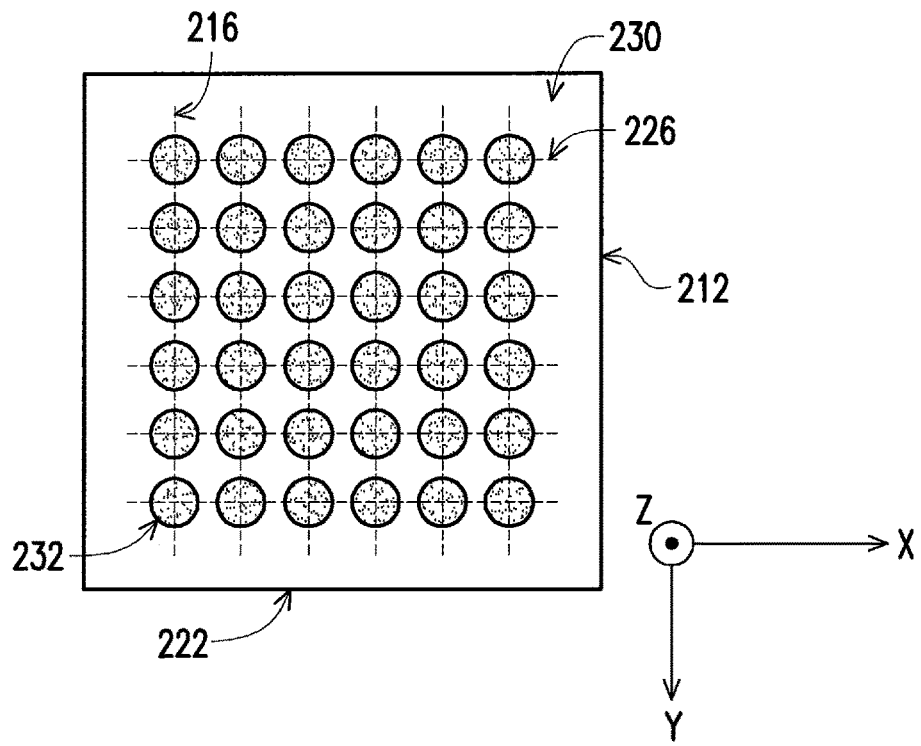
FIG. 2B illustrates an exemplary grating region comprising an array of scattering elements in a 2D grating coupler, in accordance with some embodiments of the present disclosure.

FIG. 2B illustrates an expanded view of the exemplary grating region 230 comprising an array of scattering elements 232 in a 2D grating coupler, in accordance with some embodiments of the present disclosure. As shown in FIG. 2B, a shape of the grating region 230 may be a square in the planar layer. In one embodiment, the array of scattering elements are arranged in the planar layer at a plurality of intersections of a first set of straight lines 216 crossing with a second set of straight lines 226. Each of the first set of straight lines 216 is parallel to the first side 212 of the grating region 230; and each of the second set of straight lines 226 is parallel to the second side 222 of the grating region 230. Any numbers of straight lines 216, 226 and any numbers of scattering elements 232 on each straight line can be used and are within the scope of the present disclosure. As shown in FIG. 2A and FIG. 2B, each scattering element 232 in the array of scattering elements has a same circular shape with a same size in the planar layer. In another embodiment, each scattering element in the array of scattering elements has a same square shape with a same size in the planar layer. As shown in FIG. 2A and FIG. 2B, the array of scattering elements 232 are evenly distributed in the planar layer such that there is a same distance between centers of every two adjacent scattering elements 232 along either a first direction (the X direction) perpendicular to the first side 212 of the grating region 230 or a second direction (the Y direction) perpendicular to the second side 222 of the grating region 230.

Referring back to FIG. 2A, the 2D grating coupler 200 may scatter incident light received from the first waveguide 218 in a direction perpendicular to the first side 212 along the —X direction; and may also scatter incident light received from the second waveguide 228 in a direction perpendicular to the second side 222 along the —Y direction.

Figure 2C:
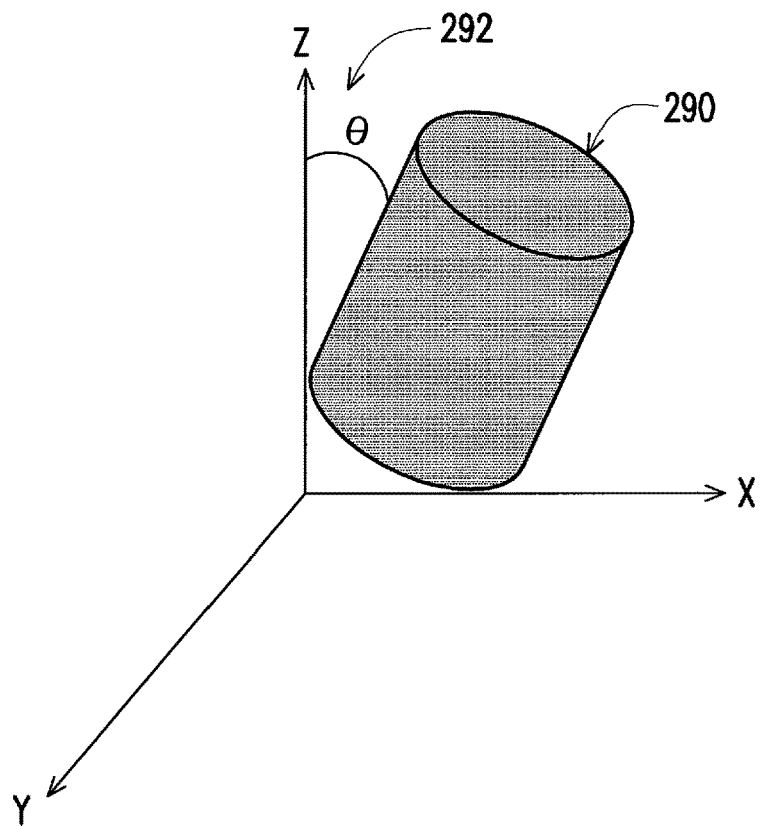
FIG. 2C illustrates an exemplary optical fiber coupled to a 2D grating coupler with an incident angle, in accordance with some embodiments of the present disclosure.

In one embodiment, the 2D grating coupler 200 scatters incident light received from a fiber having a fiber mode 250 attached to the 2D grating. In one embodiment, the 2D grating 230 of the coupler 200 is configured for receiving an incident light from an optical fiber 290 with an incident angle 292, as shown in FIG. 2C. The incident angle 292 is measured in plane of incidence between an axis of the optical fiber 290 and the Z direction, a direction perpendicular to the planar layer. The plane of incidence is a plane which contains the surface normal of the planar layer and the propagation vector of the incident light. That is, the plane of incidence is the plane formed by the Z direction and the X direction. In one embodiment, the incident angle 292 is non-zero. Both the optical fiber 290 and the 2D grating coupler 200 may be attached to or included in a photonic die on a substrate. The 2D grating coupler 200 includes an array of scattering elements 232 on the photonic die for transmitting light between the photonic die and the optical fiber 290.

The 2D grating coupler 200 may be configured for splitting the incident light received from the fiber on top of the planar layer to a parallel polarization component and an orthogonal polarization component. In one embodiment, the 2D grating coupler 200 couples the parallel polarization component to the first waveguide 218 via the first taper structure 210; and couples the orthogonal polarization component to the second waveguide 228 via the second taper structure 220. Alternatively, the 2D grating coupler 200 can couple the orthogonal polarization component to the first waveguide 218 via the first taper structure 210; and couples the parallel polarization component to the second waveguide 228 via the second taper structure 220.

As shown in FIG. 2A, the first taper structure 210 has a reducing first width from the first side 212 to the first waveguide 218; and the second taper structure 220 has a reducing second width from the second side 222 to the second waveguide 228. In one embodiment, the first taper structure 210 is configured for transmitting a first portion of the incident light from the fiber to the first waveguide 218 to achieve a minimum insertion loss; and the second taper structure 220 is configured for transmitting a second portion of the incident light to the second waveguide 228 to achieve a minimum insertion loss. The first portion of the incident light is substantially a parallel polarization component of the incident light, and the second portion of the incident light is substantially an orthogonal polarization component of the incident light. Each of the parallel polarization component and the orthogonal polarization component comprises a polarized light split from the incident light. The polarized light has either a transverse magnetic (TM) polarization mode or a transverse magnetic (TE) polarization mode.

Figure 3A:
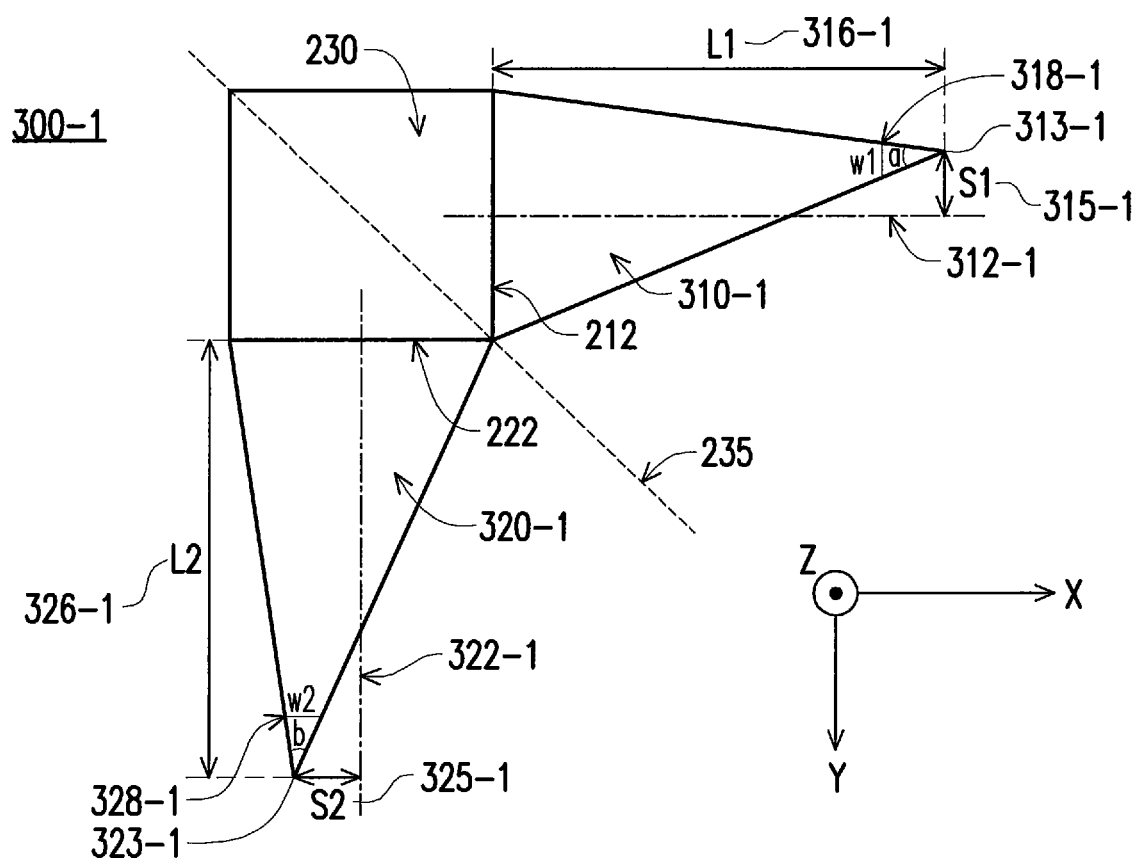
FIG. 3A illustrates an exemplary diagram of a 2D grating coupler with designed taper shape and dimensions, in accordance with some embodiments of the present disclosure.

FIG. 3A illustrates an exemplary block diagram of a 2D grating coupler 300-1, which may be implemented as the 2D grating coupler 200 in FIG. 2A, with designed taper shape and dimensions, in accordance with some embodiments of the present disclosure. As shown in FIG. 3A, the 2D grating coupler 300-1 includes: a grating region 230 in a planar layer, a first taper structure 310-1 in the planar layer connecting a first side 212 of the grating region 230 to a first waveguide, a second taper structure 320-1 in the planar layer connecting a second side 222 of the grating region 230 to a second waveguide. In one embodiment, the grating region 230 has a square shape; and the first side 212 and the second side 222 are substantially perpendicular to each other.

In the example shown in FIG. 3A, a shape of the first taper structure 310-1 is a first triangle that is asymmetric about any line perpendicular to the first side 212 of the grating region 230 in the planar layer; and a shape of the second taper structure 320-1 is a second triangle that is asymmetric about any line perpendicular to the second side 222 of the grating region 230 in the planar layer. In one embodiment, the first triangle and the second triangle are congruent. Although each of the first taper structure 310-1 and the second taper structure 320-1 may have a shape of a trapezoid in practice, a design of the triangle shape automatically determines a corresponding design of the trapezoid, with given widths of the first and second waveguides. For example, once the shape and dimensions of the first triangle 310-1 are determined, one can determine a corresponding trapezoid having a top side 318-1 with a given width w1 and having three other sides residing on the three sides of the first triangle 310-1; once the shape and dimensions of the second triangle 320-1 are determined, one can determine a corresponding trapezoid having a top side 328-1 with a given width w2 and having three other sides residing on the three sides of the second triangle 320-1. The width w1 may be determined based on a width of the first waveguide; and the width w2 may be determined based on a width of the second waveguide. As such, the rest of the application will focus on the design of the triangles, instead of trapezoids.

As shown in FIG. 3A, the first triangle has a first base side residing on the first side 212 of the grating region 230, has a first vertex 313-1 opposite to the first base side 212, and has a first length L1 316-1 along the X direction; and the second triangle has a second base side residing on the second side 222 of the grating region 230, has a second vertex 323-1 opposite to the second base side 222, and has a second length L2 326-1 along the Y direction. As shown in FIG. 3A, the first vertex 313-1 has a first distance or shift S1 315-1 to a perpendicular bisector 312-1 of the first base side 212 in the planar layer; and the second vertex 323-1 has a second distance or shift S2 325-1 to a perpendicular bisector 322-1 of the second base side 222 in the planar layer.

In one embodiment, the first triangle and the second triangle are symmetric to each other about a diagonal line 235 crossing the grating region 230. In this case, the first length L1 316-1 and the second length L2 326-1 are equal to each other; the first distance S1 315-1 and the second distance S2 325-1 are equal to each other.

According to various embodiments, the values of the first length L1 316-1, the second length L2 326-1, the first distance S1 315-1 and the second distance S2 325-1 can be determined based on the incident angle and a position of the optical fiber relative to the 2D grating 230. According to various embodiments, each of the first length L1 316-1 and the second length L2 326-1 is between 20 and 500 micrometers; and each of the first distance S1 315-1 and the second distance S2 325-1 is between 0 and 20 micrometers. In some embodiments, each of the first length L1 316-1 and the second length L2 326-1 is between 100 and 150 micrometers; and each of the first distance S1 315-1 and the second distance S2 325-1 is between 0 and 10 micrometers. It can be understood that once the first length L1 316-1, the second length L2 326-1, the first distance S1 315-1 and the second distance S2 325-1 are determined, the top angle a of the top vertex 313-1 and the top angle b of the top vertex 323-1 are automatically determined as well.

Figure 3B:
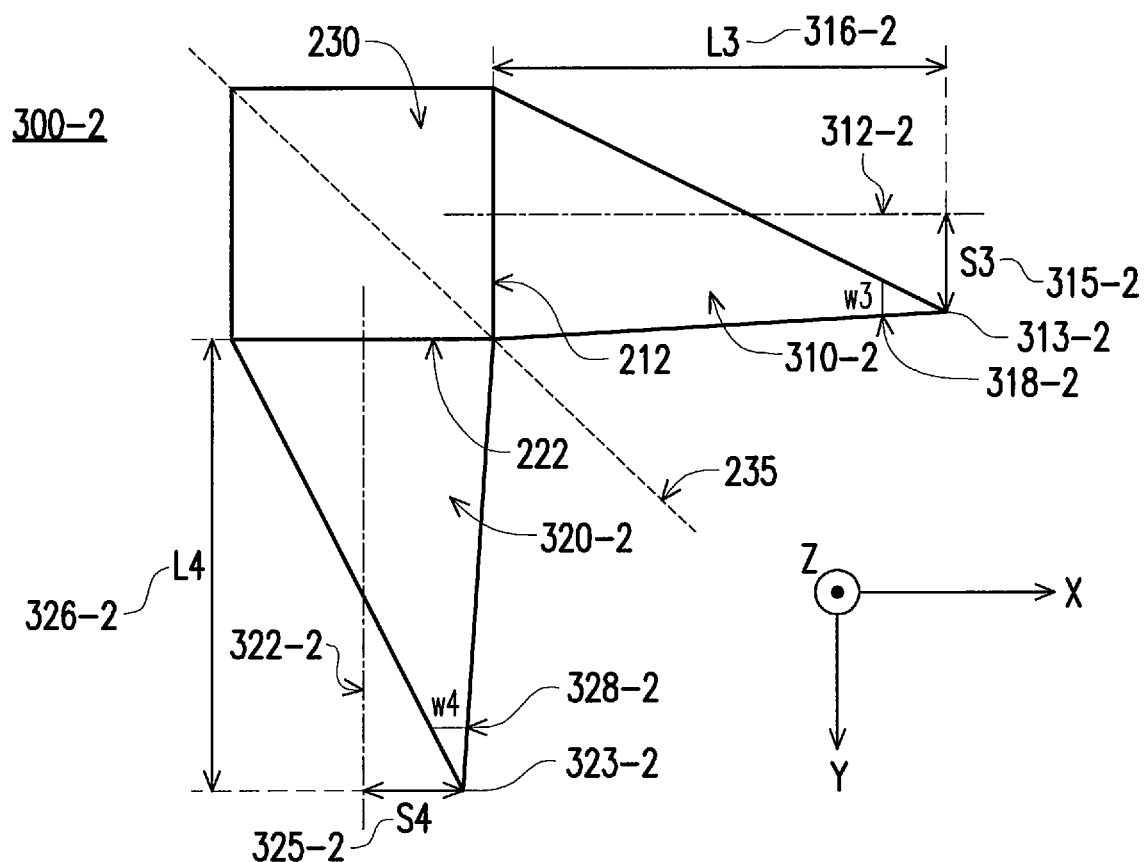
FIG. 3B illustrates an exemplary diagram of another 2D grating coupler with designed taper shape and dimensions, in accordance with some embodiments of the present disclosure.

FIG. 3B illustrates an exemplary diagram of another 2D grating coupler 300-2, which may be implemented as the 2D grating coupler 200 in FIG. 2A, with designed taper shape and dimensions, in accordance with some embodiments of the present disclosure. As shown in FIG. 3B, the 2D grating coupler 300-2 includes: a grating region 230 in a planar layer, a first taper structure 310-2 in the planar layer connecting a first side 212 of the grating region 230 to a first waveguide, a second taper structure 320-2 in the planar layer connecting a second side 222 of the grating region 230 to a second waveguide. In one embodiment, the grating region 230 has a square shape; and the first side 212 and the second side 222 are substantially perpendicular to each other.

In the example shown in FIG. 3B, a shape of the first taper structure 310-2 is a first triangle that is asymmetric about any line perpendicular to the first side 212 of the grating region 230 in the planar layer; and a shape of the second taper structure 320-2 is a second triangle that is asymmetric about any line perpendicular to the second side 222 of the grating region 230 in the planar layer. In one embodiment, the first triangle and the second triangle are congruent. Although each of the first taper structure 310-2 and the second taper structure 320-2 may have a shape of a trapezoid in practice, a design of the triangle shape automatically determines a corresponding design of the trapezoid, with given widths of the first and second waveguides. For example, once the shape and dimensions of the first triangle 310-2 are determined, one can determine a corresponding trapezoid having a top side 318-2 with a given width w3 and having three other sides residing on the three sides of the first triangle 310-2; once the shape and dimensions of the second triangle 320-2 are determined, one can determine a corresponding trapezoid having a top side 328-2 with a given width w4 and having three other sides residing on the three sides of the second triangle 320-2. The width w3 may be determined based on a width of the first waveguide; and the width w4 may be determined based on a width of the second waveguide. As such, the rest of the application will focus on the design of the triangles, instead of trapezoids.

As shown in FIG. 3B, the first triangle has a first base side residing on the first side 212 of the grating region 230, has a first vertex 313-2 opposite to the first base side 212, and has a first length L3 316-2 along the X direction; and the second triangle has a second base side residing on the second side 222 of the grating region 230, has a second vertex 323-2 opposite to the second base side 222, and has a second length L4 326-2 along the Y direction. As shown in FIG. 3B, the first vertex 313-2 has a first distance or shift S3 315-2 to a perpendicular bisector 312-2 of the first base side 212 in the planar layer; and the second vertex 323-2 has a second distance or shift S4 325-2 to a perpendicular bisector 322-2 of the second base side 222 in the planar layer.

In one embodiment, the first triangle and the second triangle are symmetric to each other about a diagonal line 235 crossing the grating region 230. In this case, the first length L3 316-2 and the second length L4 326-2 are equal to each other; the first distance S3 315-2 and the second distance S4 325-2 are equal to each other.

According to various embodiments, the values of the first length L3 316-2, the second length L4 326-2, the first distance S3 315-2 and the second distance S4 325-2 can be determined based on the incident angle and a position of the optical fiber relative to the 2D grating 230. According to various embodiments, each of the first length L3 316-2 and the second length L4 326-2 is between 20 and 500 micrometers; and each of the first distance S3 315-2 and the second distance S4 325-2 is between 0 and 20 micrometers.

While the vertex 313-1 in FIG. 3A has a shift S1 above the perpendicular bisector 312-1 along the —Y direction, the vertex 313-2 in FIG. 3B has a shift S3 below the perpendicular bisector 312-2 along the Y direction. While the vertex 323-1 in FIG. 3A has a shift S2 to the left of the perpendicular bisector 322-1 along the —X direction, the vertex 323-2 in FIG. 3B has a shift S4 to the right of the perpendicular bisector 322-2 along the X direction. The shift of the top vertex of each taper triangle can be designed based on a position of the optical fiber coupled to the 2D grating and/or an incident angle of incident light from the optical fiber.

Figure 4A:
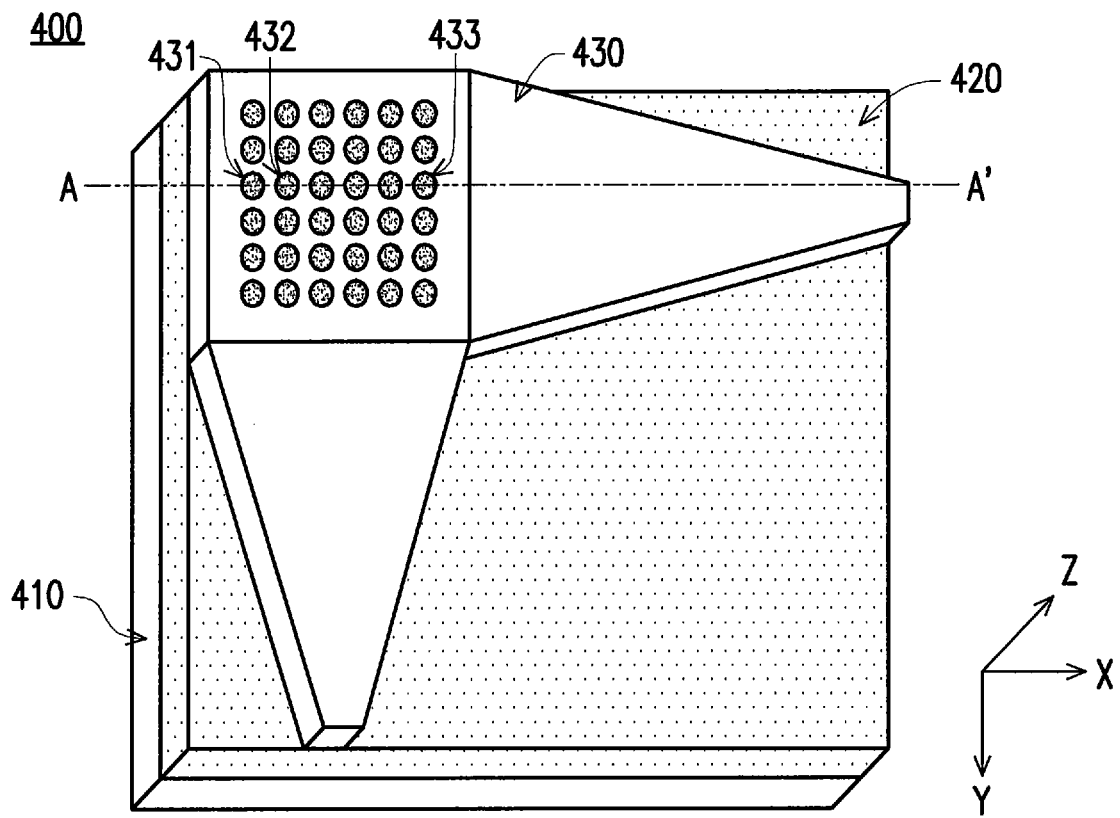
FIG. 4A illustrates a perspective view of a 2D grating coupler, in accordance with some embodiments of the present disclosure.

FIG. 4A illustrates a perspective view of a 2D grating coupler 400, in accordance with some embodiments of the present disclosure. As shown in FIG. 4A, the 2D grating coupler 400 includes an array of scattering elements and two tapers formed in a semiconductor layer 430. In one embodiment, each scattering elements 431, 432, 433 comprise a dielectric material such as silicon oxide, while the semiconductor layer 430 comprises a semiconductor material such as silicon. In the illustrated embodiment, the semiconductor layer 430 is fabricated on an insulation layer 420 which is formed on a semiconductor substrate 410.

Figure 4B:
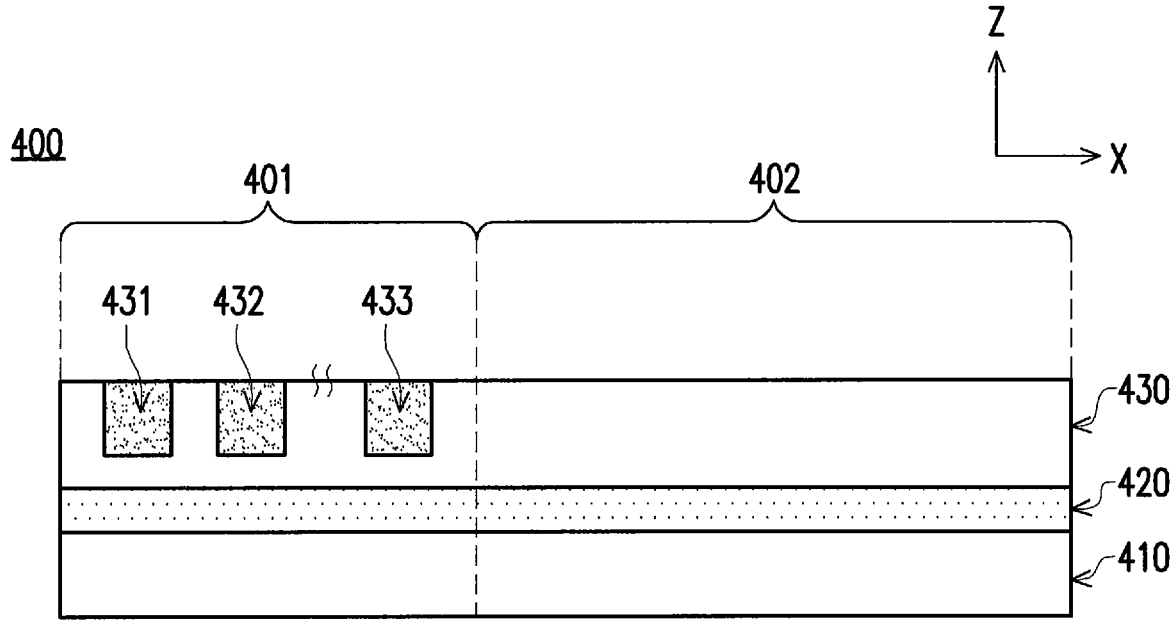
FIG. 4B illustrates a cross-sectional view of a 2D grating coupler, in accordance with some embodiments of the present disclosure.

FIG. 4B illustrates a cross-sectional view of a 2D grating coupler 400 along the direction A-A' in FIG. 4A, in accordance with some embodiments of the present disclosure. In the illustrated embodiments, the 2D grating coupler 400 fabricated on a semiconductor substrate 410 comprises a multi-layered structure comprising an insulation layer 420 and a semiconductor layer 430. In the illustrated embodiment, the semiconductor substrate 410 comprises silicon. The insulation layer 420 comprises a dielectric material such as silicon oxide, and is fabricated on the semiconductor substrate 410 using chemical vapor deposition, physical vapor deposition, etc. In some embodiments, the insulation layer 420 can be replaced by other types of dielectric materials, such as Si3N4, SiO2 (e.g., quartz, and glass), Al2O3, and H2O, according to various embodiments of the present disclosure. In some embodiments, the semiconductor layer 430 comprises silicon and is deposited on the insulation layer 420 using chemical vapor deposition. In some embodiments, the semiconductor substrate 410, the insulation layer 420 and the semiconductor layer 430 are formed as a silicon-on-insulator (SOI) substrate.

In some embodiments, the scattering elements 431, 432, 433 are formed according to a predetermined pattern as shown in FIG. 4A and FIG. 2B. In some embodiments, the scattering elements 431, 432, 433 are formed as part of a cladding layer comprising silicon oxide. In some embodiments, the cladding layer can comprise other types of dielectric materials according to different applications, including polycrystalline silicon and silicon nitride.

In some embodiments, the 2D grating coupler 400 may further comprise: a bottom reflection layer that is located between the semiconductor substrate 410 and the insulation layer 420 and comprises at least one of the following: Al, Cu, Ni, and a combination; and/or a top reflection layer that is located on the cladding layer and comprises at least one of the following: Al, Cu, Ni and a combination. In some embodiments, the top reflection layer only covers the taper structures 402 of the 2D grating coupler 400. In some embodiments, the taper structures 402 of the 2D grating coupler 400 comprise the same material used in the grating region 401 of the semiconductor layer 430. In other embodiments, the taper structures 402 comprise a second material that is different from the material used in the grating region 401 of the semiconductor layer 430.

Figure 5A:
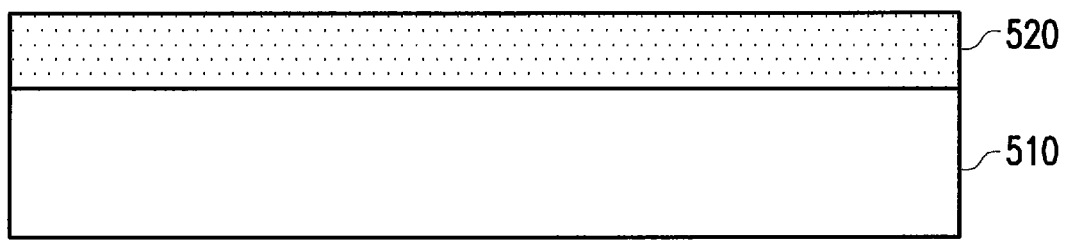
FIGS. 5A-5K illustrate cross-sectional views of an exemplary grating coupler at various stages of a fabrication process, in accordance with some embodiments of the present disclosure.

FIGS. 5A-5K illustrate cross-sectional views of an exemplary grating coupler 500 at various stages of a fabrication process, in accordance with some embodiments of the present disclosure. FIG. 5A is a cross-sectional view of the grating coupler 500-1 including a first layer 510 and a second layer 520 disposed on the first layer 510, at one of the various stages of fabrication, according to some embodiments of the present disclosure. The first layer 510 may be formed of silicon or another semiconductor material as a substrate. The second layer 520 may be formed of silicon oxide or another oxide material as an insulation layer.

Figure 5B:
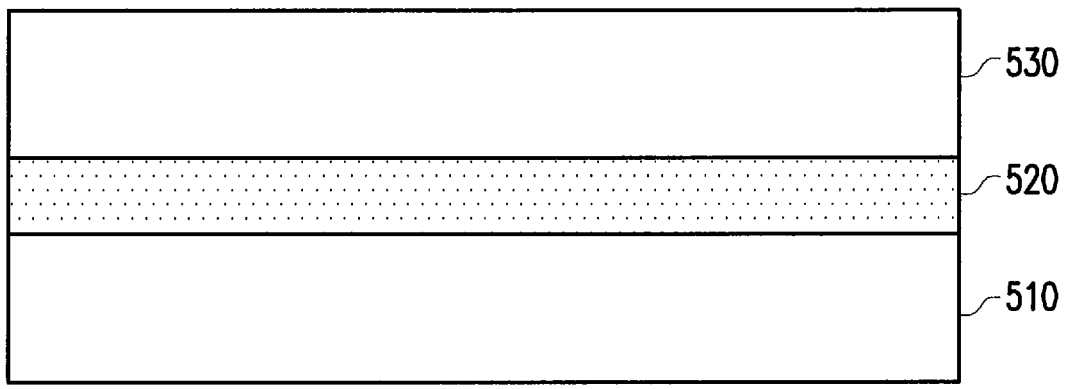

FIG. 5B is a cross-sectional view of the grating coupler 500-2 including a semiconductor layer 530 formed on the insulation layer 520 at one of the various stages of fabrication, according to some embodiments of the present disclosure. The semiconductor layer 530 may be formed by an epitaxial growth of a semiconductor material, e.g. silicon, on the insulation layer 520.

Figure 5C:
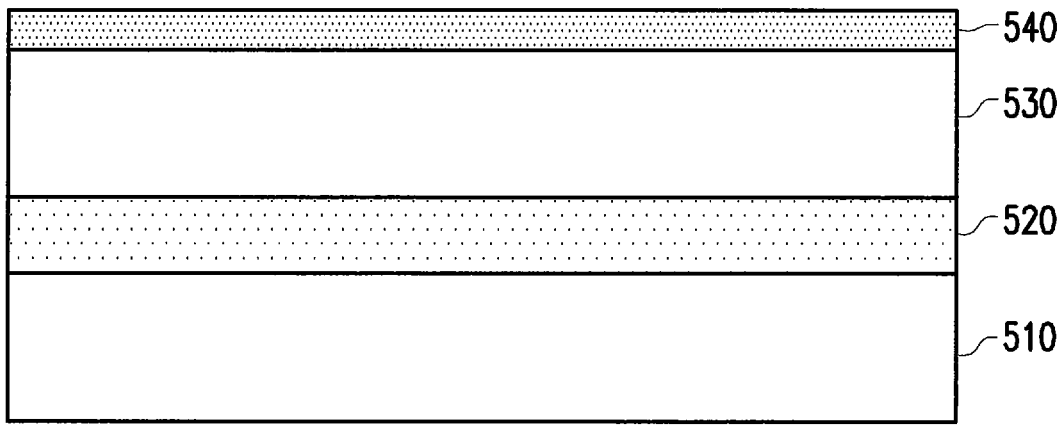

FIG. 5C is a cross-sectional view of the grating coupler 500-3 including a hard mask layer 540 deposited on the semiconductor layer 530 at one of the various stages of fabrication, according to some embodiments of the present disclosure. The hard mask layer 540 on the semiconductor layer 530 may comprise an organic or inorganic material.

Figure 5D:
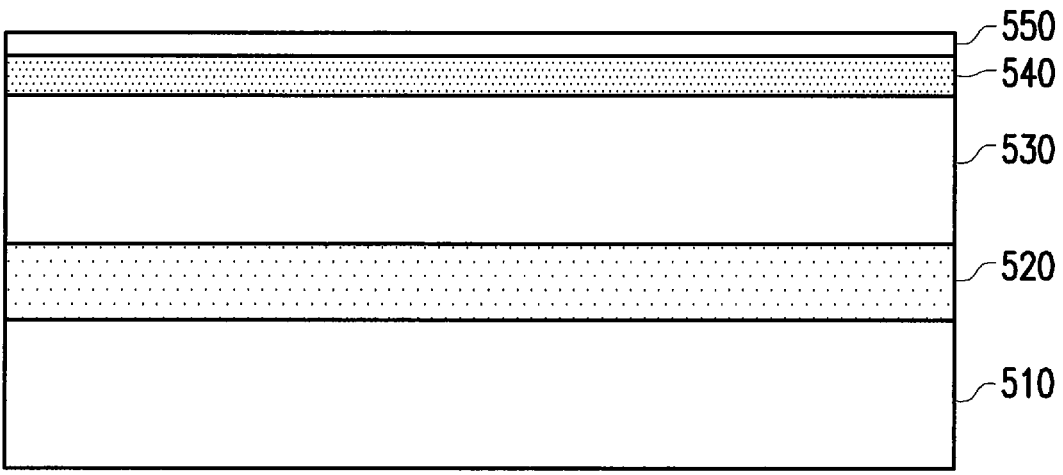

FIG. 5D is a cross-sectional view of the grating coupler 500-4 including a photoresist layer 550 deposited on the hard mask layer 540 at one of the various stages of fabrication, according to some embodiments of the present disclosure. The photoresist layer 550 on the hard mask layer 540 may comprise a photoresist material.

Figure 5E:
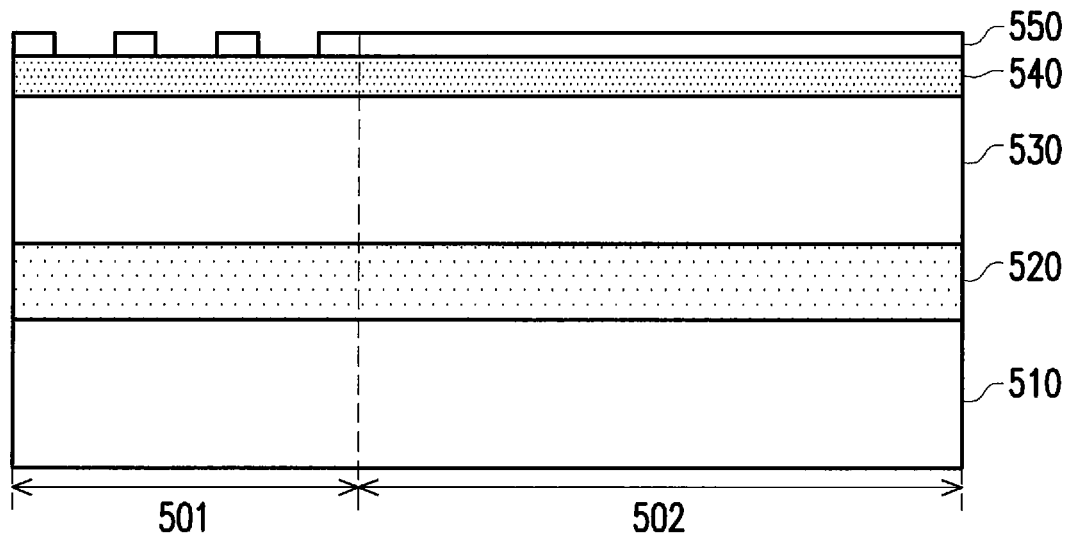

FIG. 5E is a cross-sectional view of the grating coupler 500-5 including patterned portions of the photoresist layer 550, formed on the hard mask layer 540 at one of the various stages of fabrication, according to some embodiments of the present disclosure. The photoresist layer 550 is patterned according a predetermined pattern, e.g. by removing portions corresponding to the scattering elements shown in FIGS. 1-4, based on waveguide lithography and development. Based on the pattern, the grating coupler can be divided into portions including the grating region 501 and the taper structures 502.

Figure 5F:
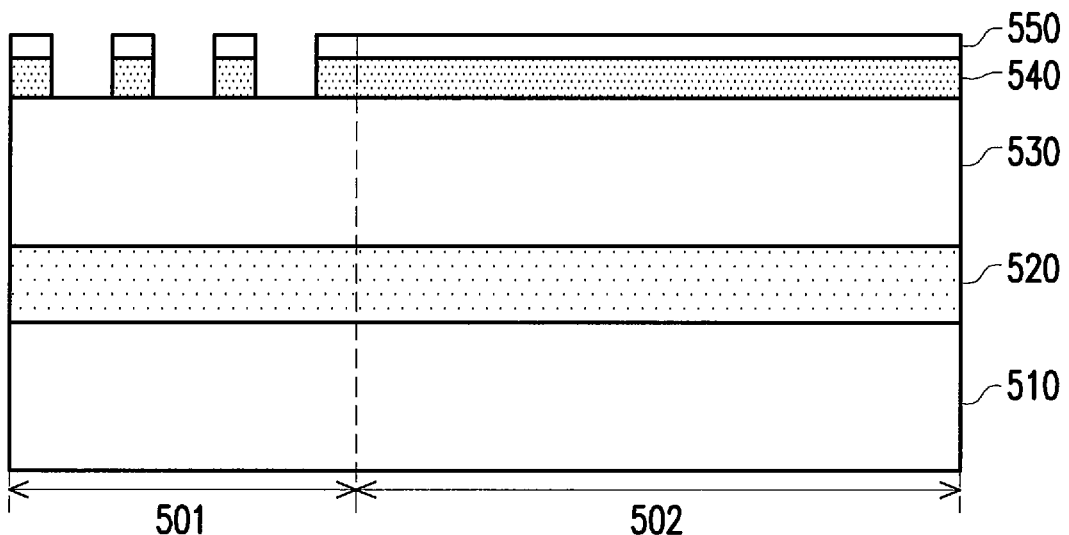

FIG. 5F is a cross-sectional view of the grating coupler 500-6 including patterned portions of the hard mask layer 540, formed at one of the various stages of fabrication, according to some embodiments of the present disclosure. Because the photoresist layer 550 was patterned to have openings over the hard mask layer 540, the portions of the hard mask layer 540 that are exposed by the photoresist layer 550 are removed, e.g., via a wet or dry etch procedure. For simplicity of illustration, three openings are shown in the grating region 501. It can be understood that any numbers of openings in the grating region 501 can be fabricated according a predetermined pattern and are within the scope of the present disclosure.

Figure 5G:
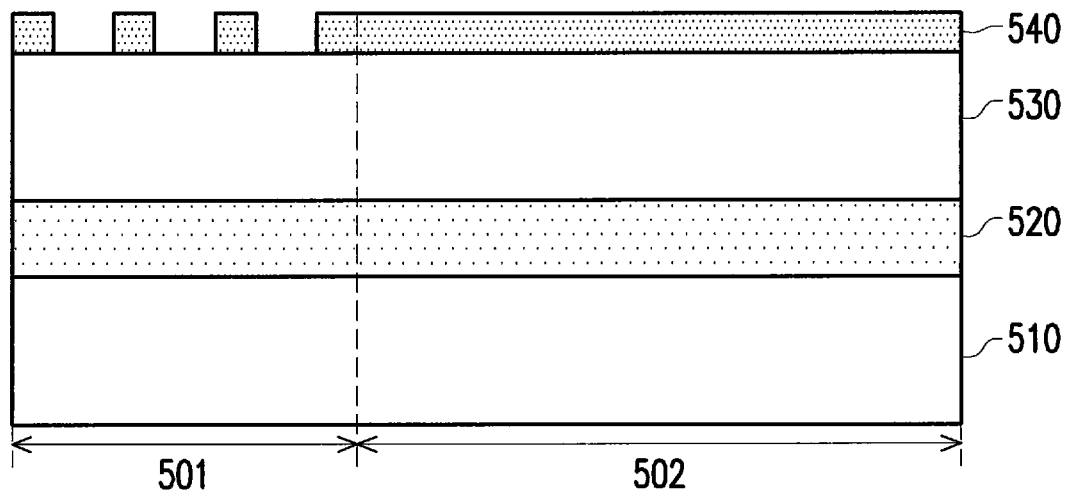

FIG. 5G is a cross-sectional view of the grating coupler 500-7, where the photoresist layer 550 is removed at one of the various stages of fabrication, according to some embodiments of the present disclosure. For example, the photoresist layer 550 may be removed by a resist stripping.

Figure 5H:
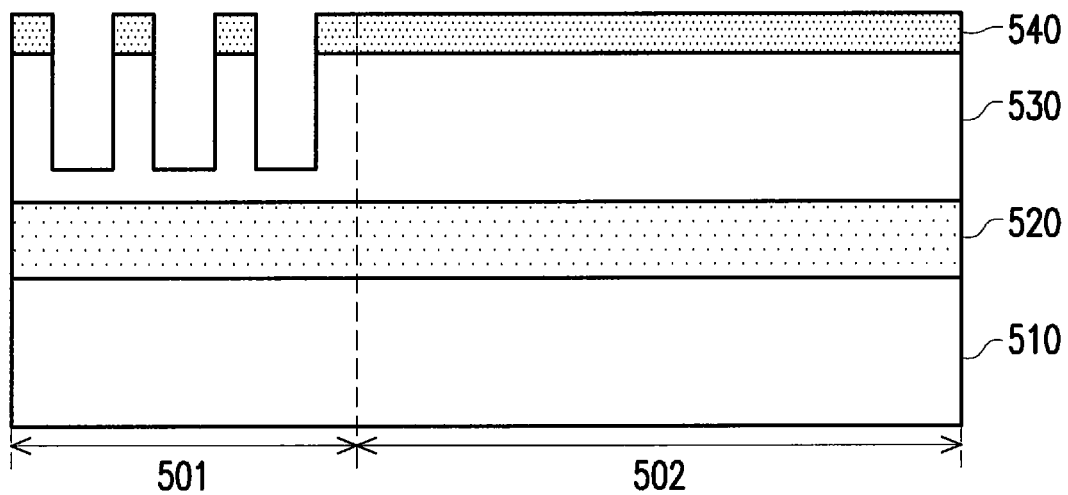

FIG. 5H is a cross-sectional view of the grating coupler 500-8 including an array of etched regions 532, 534, 536, formed at one of the various stages of fabrication, according to some embodiments of the present disclosure. Because the hard mask layer 540 was patterned to have openings over the semiconductor layer 530, the portions of the semiconductor layer 530 that are exposed by the hard mask layer 540 are removed, e.g., via a wet or dry etch procedure, to form the array of etched regions 532, 534, 536.

In some embodiments, surfaces of the etched regions 532, 534, 536 may be smoothed by: oxidizing the silicon surfaces of the etched regions 532, 534, 536; etching the silicon oxide surfaces; and repeating the oxidizing and the etching several times to smooth the surfaces of the etched regions 532, 534, 536.

Figure 5I:
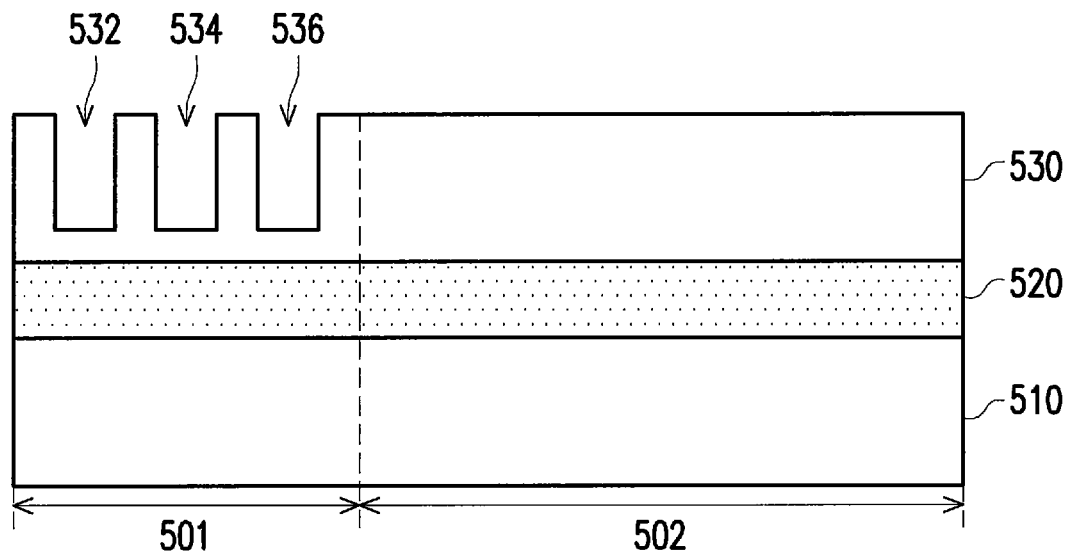

FIG. 5I is a cross-sectional view of the grating coupler 500-9, where the hard mask layer 540 is removed at one of the various stages of fabrication, according to some embodiments of the present disclosure. For example, the hard mask layer 540 may be removed by a resist stripping.

Figure 5J:
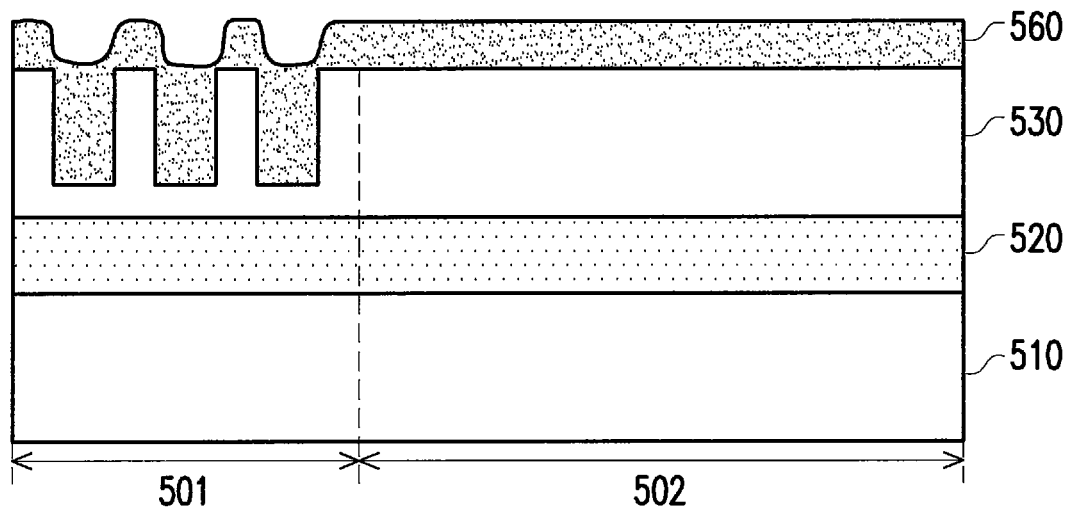

FIG. 5J is a cross-sectional view of the grating coupler 500-10 including a cladding layer 560, which is formed at one of the various stages of fabrication, according to some embodiments of the present disclosure. The cladding layer 560 may be formed by depositing a dielectric material such as silicon oxide over the semiconductor layer 530 and into the array of etched regions 532, 534, 536.

Figure 5K:
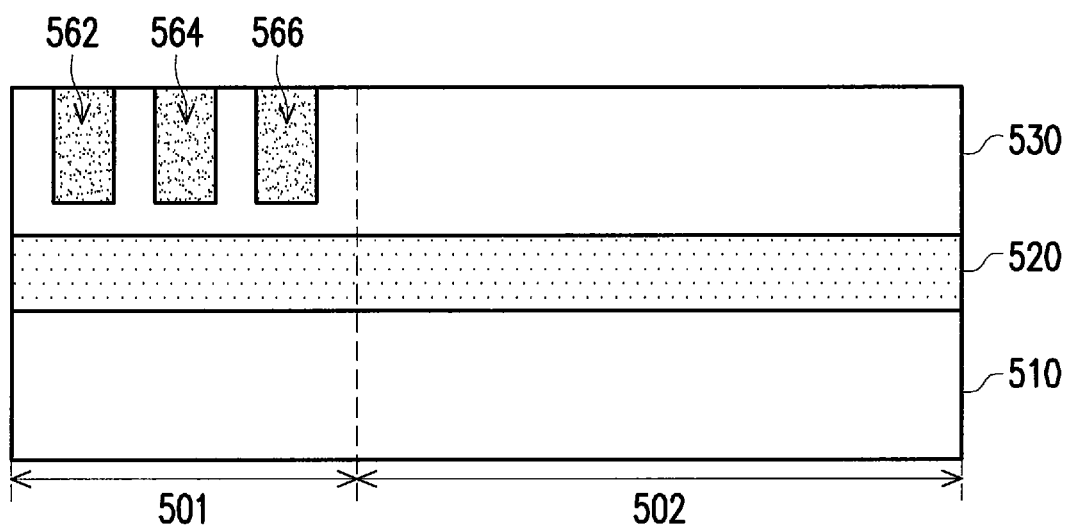

FIG. 5K is a cross-sectional view of the grating coupler 500-11, where the top portion of the cladding layer 560 is polished at one of the various stages of fabrication, according to some embodiments of the present disclosure. The top portion of the cladding layer 560 may be polished to form an array of scattering elements 562, 564, 566 in the array of etched regions 532, 534, 536, e.g. based on a chemical-mechanical polishing process.

Figure 6:
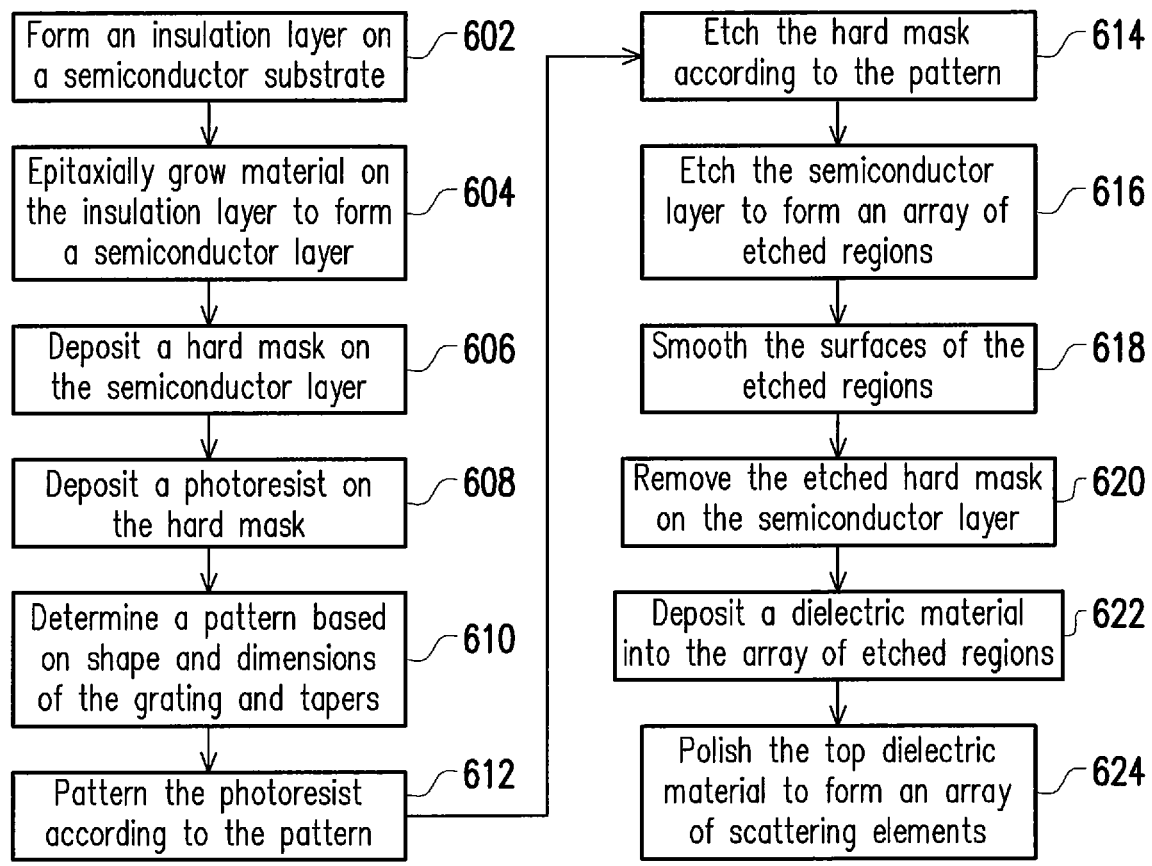
FIG. 6 illustrates a flow chart of an exemplary method for making an exemplary 2D grating coupler, in accordance with some embodiments of the present disclosure.

FIG. 6 illustrates a flow chart of an exemplary method 600 for making an exemplary 2D grating coupler, e.g. any one of the 2D grating couplers disclosed in FIGS. 1-4, in accordance with some embodiments of the present disclosure. At operation 602, an insulation layer is formed on a semiconductor substrate. At operation 604, a semiconductor material is epitaxially grown on the insulation layer to form a semiconductor layer. At operation 606, a hard mask is deposited on the semiconductor layer. At operation 608, a photoresist is deposited on the hard mask. At operation 610, a pattern is determined based on shape and dimensions of the grating and tapers. In various embodiments, the tapers may have different shapes and sizes as shown in FIGS. 1-4. The tapers may be designed based on simulation in accordance with desired fiber position and incident angle.

At operation 612, the photoresist is patterned according to the pattern. At operation 614, the hard mask is etched according to the pattern. At operation 616, the semiconductor layer is etched to form an array of etched regions. At operation 618, the surfaces of the etched regions are smoothed, e.g. by repetitively oxidizing the surfaces and etching the oxidized surfaces. At operation 620, the etched hard mask on the semiconductor layer is removed. At operation 622, a dielectric material is deposited into the array of etched regions and over the semiconductor layer. At operation 624, the top dielectric material is polished to form an array of scattering elements. The order of the operations in FIG. 6 may be changed according to various embodiments of the present teaching.

Figure 7A:
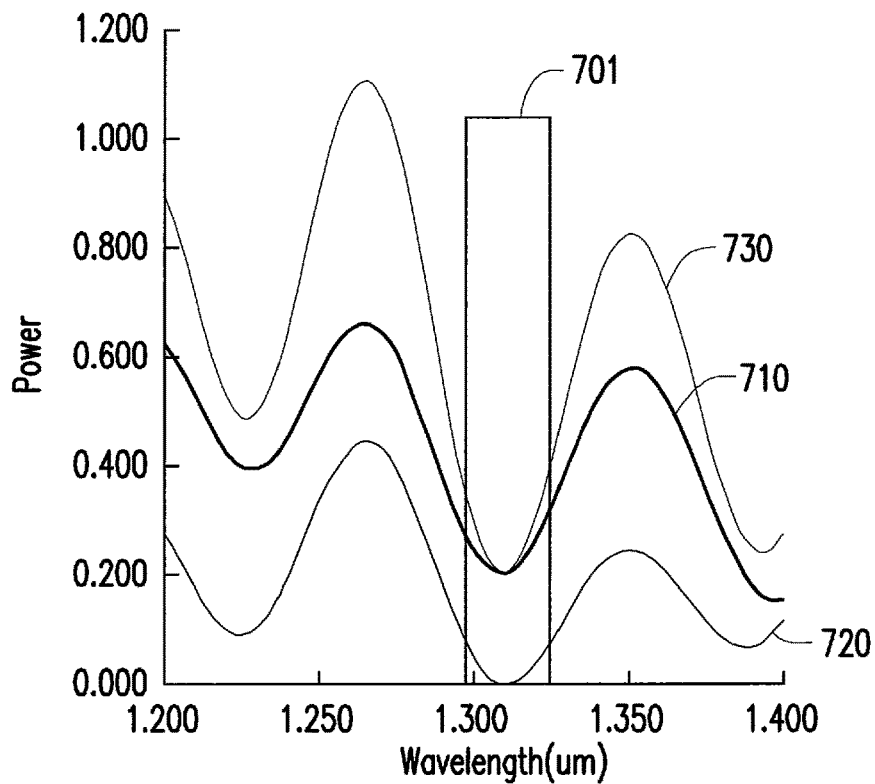
FIG. 7A illustrates an exemplary light power performance of a 2D grating coupler with different input light wavelengths, in accordance with some embodiments of the present disclosure.

FIG. 7A illustrates an exemplary light power performance of a 2D grating coupler, e.g. any one of the 2D grating couplers disclosed in FIGS. 1-4, with different input light wavelengths, in accordance with some embodiments of the present disclosure. This can be achieved by simulating beam propagation as input light to the 2D grating coupler based on a plane wave expansion method. As discussed above, the taper design aims to minimize light power loss when transmitting light from a fiber to the 2D grating coupler. The power loss may be due to a light transmission through the 2D grating (e.g. along the −Z direction in FIGS. 2-4); and due to a light reflection back from the 2D grating (e.g. along the Z direction in FIGS. 2-4). While the curves 710, 720 represent light power loss due to light transmission through and light reflection back from the 2D grating respectively, the curve 730 represents a sum of the two power loss. Based on the simulated beam propagation, an optimal wavelength range 701 can be selected for the input light to minimize light power loss due to light transmission and reflection with respect to the 2D grating.

Figure 7B:
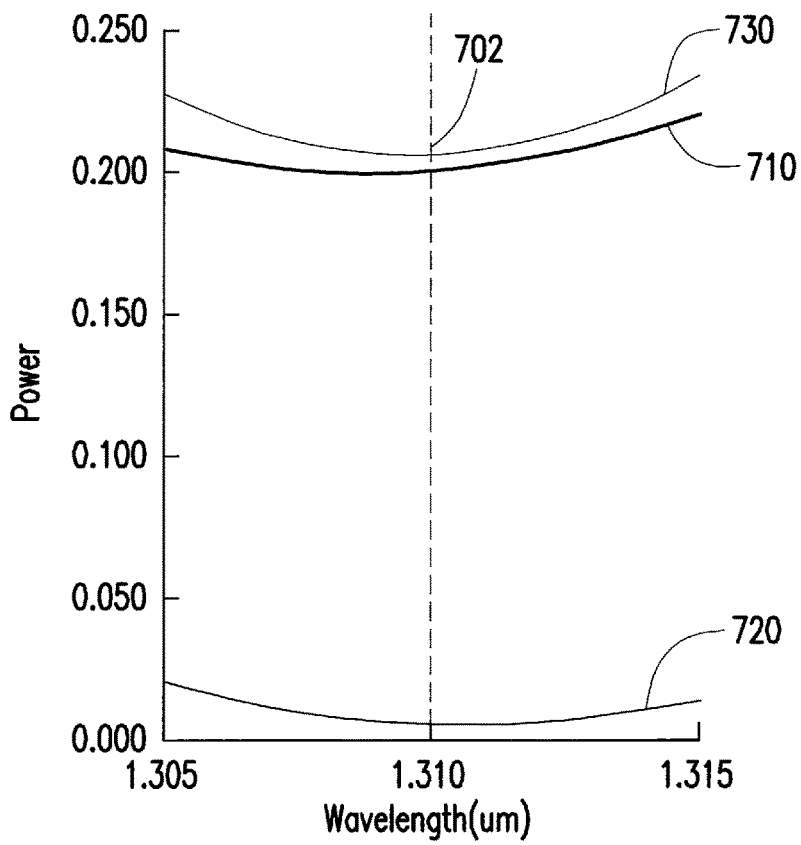
FIG. 7B illustrates an expanded view of an exemplary selected wavelength range for input light of a 2D grating coupler, in accordance with some embodiments of the present disclosure.

FIG. 7B illustrates an expanded view of the selected wavelength range 701 for input light of the 2D grating coupler, in accordance with some embodiments of the present disclosure. As shown in FIG. 7B, the minimal value point 702 of the total power loss 730 corresponds to a wavelength of about 1310 nanometers.

In one embodiment, shape and dimensions of each taper structure of the 2D grating coupler can be adjusted to fit output light from the 2D grating, based on an incident light with the selected wavelength of about 1310 nanometers. For example, various values can be simulated for the length and shift of each taper to maximize light power received at the corresponding waveguide from the taper. In one example, gradually increasing or decreasing values can be simulated for the length and shift of each taper. According to various embodiments, the gradually increasing or decreasing values for the length of tapers may be between 20 and 500 micrometers; and the gradually increasing or decreasing values for the shift of tapers may be between 0 and 20 micrometers.

In some embodiments, each of the first length L1 316-1 and the second length L2 326-1 is between 20 and 500 micrometers; and each of the first distance S1 315-1 and the second distance S2 325-1 is between 0 and 20 micrometers.

Figure 8:
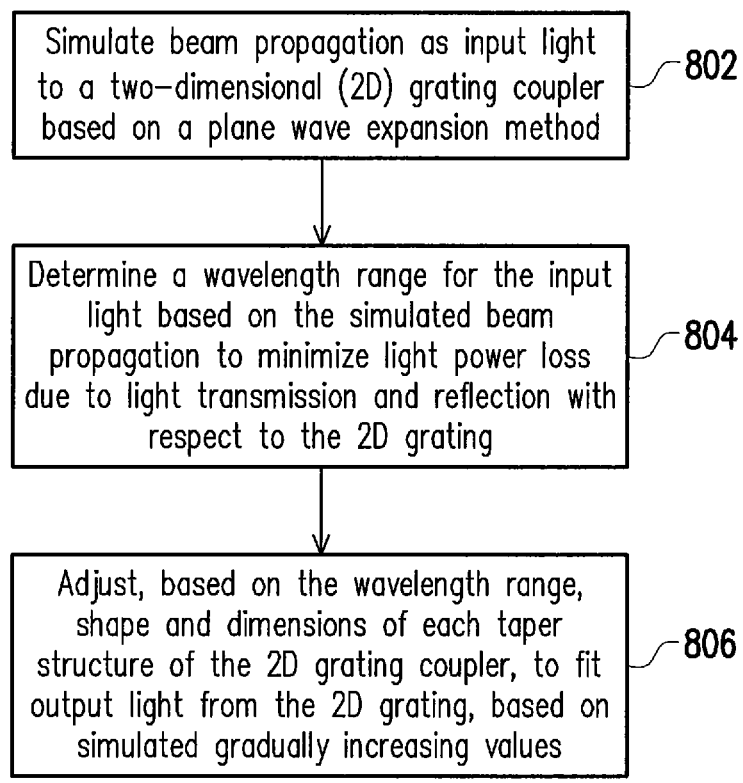
FIG. 8 illustrates a flow chart of an exemplary method for designing an exemplary 2D grating coupler, in accordance with some embodiments of the present disclosure.

FIG. 8 illustrates a flow chart of an exemplary method 800 for designing an exemplary 2D grating coupler, e.g. any one of the 2D grating couplers disclosed in FIGS. 1-4, in accordance with some embodiments of the present disclosure. At operation 802, beam propagation is simulated as input light to a 2D grating coupler based on a plane wave expansion method. At operation 804, a wavelength range is determined for the input light based on the simulated beam propagation to minimize light power loss due to light transmission and reflection with respect to the 2D grating. At operation 806, based on the wavelength range, shape and dimensions of each taper structure of the 2D grating coupler are adjusted to fit output light from the 2D grating, based on simulated gradually increasing values. The order of the operations in FIG. 8 may be changed according to various embodiments of the present teaching.

In one embodiment, an apparatus for optical coupling is disclosed. The apparatus includes: a planar layer; a grating region comprising an array of scattering elements arranged in the planar layer to form a two-dimensional (2D) grating; a first taper structure formed in the planar layer connecting a first side of the grating region to a first waveguide, wherein a shape of the first taper structure is a first triangle that is asymmetric about any line perpendicular to the first side of the grating region in the planar layer; and a second taper structure formed in the planar layer connecting a second side of the grating region to a second waveguide, wherein a shape of the second taper structure is a second triangle that is asymmetric about any line perpendicular to the second side of the grating region in the planar layer, wherein the first side and the second side are substantially perpendicular to each other.

In another embodiment, a method for designing a two-dimensional (2D) grating coupler is disclosed. The method includes: simulating beam propagation as input light to the 2D grating coupler based on a plane wave expansion method, wherein the 2D grating coupler comprises: a planar layer, a grating region comprising an array of scattering elements arranged in the planar layer to form a 2D grating, a first taper structure in the planar layer connecting a first side of the grating region to a first waveguide, and a second taper structure in the planar layer connecting a second side of the grating region to a second waveguide; determining a wavelength range for the input light based on the simulated beam propagation to minimize light power loss due to light transmission and reflection with respect to the 2D grating; and adjusting, based on the wavelength range, shape and dimensions of each of the first taper structure and the second taper structure, to fit output light from the 2D grating.

In yet another embodiment, a method for forming an optical coupler is disclosed. The method includes: forming an insulation layer on a semiconductor substrate; epitaxially growing a semiconductor material on the insulation layer to form a semiconductor layer; etching, according to a predetermined pattern, the semiconductor layer to form: an array of etched holes in the semiconductor layer to form a grating region, a first taper structure extending from a first side of the grating region, wherein a shape of the first taper structure in the semiconductor layer is a first triangle that is asymmetric about any line perpendicular to the first side of the grating region, and a second taper structure extending from a second side of the grating region, wherein a shape of the second taper structure in the semiconductor layer is a second triangle that is asymmetric about any line perpendicular to the second side of the grating region, wherein the first side and the second side are substantially perpendicular to each other; and depositing a dielectric material into the array of etched regions to form an array of scattering elements in the semiconductor layer, wherein the scattering elements are arranged to form a two-dimensional (2D) grating.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus for optical coupling, comprising:
   a planar layer;
   a grating region comprising an array of scattering elements arranged in the planar layer to form a two-dimensional (2D) grating;

a first taper structure formed in the planar layer connecting a first side of the grating region to a first waveguide, wherein a shape of the first taper structure is a first triangle that is asymmetric about any line perpendicular to the first side of the grating region in the planar layer; and a second taper structure formed in the planar layer connecting a second side of the grating region to a second waveguide, wherein a shape of the second taper structure is a second triangle that is asymmetric about any line perpendicular to the second side of the grating region in the planar layer, wherein the first side and the second side are substantially perpendicular to each other, wherein:

the array of scattering elements are evenly distributed in the planar layer such that there is a same distance between centers of every two adjacent scattering elements along either a first direction perpendicular to the first side of the grating region or a second direction perpendicular to the second side of the grating region, the first triangle has a first base side residing on the first side of the grating region, has a first vertex opposite to the first base side, and has a first length along the first direction, the first vertex has a first distance to a perpendicular bisector of the first base side in the planar layer, the second triangle has a second base side residing on the second side of the grating region, has a second vertex opposite to the second base side, and has a second length along the second direction, the second vertex has a second distance to a perpendicular bisector of the second base side in the planar layer; and the first distance and the second distance are equal to each other.

2. The apparatus of claim 1, wherein a shape of the grating region is a square in the planar layer.

3. The apparatus of claim 2, wherein:
the array of scattering elements are arranged in the planar layer at a plurality of intersections of a first set of straight lines crossing with a second set of straight lines;
each of the first set of straight lines is parallel to the first side of the grating region; and
each of the second set of straight lines is parallel to the second side of the grating region.

4. The apparatus of claim 1, wherein each scattering element in the array of scattering elements has a same square shape with a same size in the planar layer.

5. The apparatus of claim 1, wherein each scattering element in the array of scattering elements has a same circular shape with a same size in the planar layer.

6. The apparatus of claim 1, wherein the first triangle and the second triangle are congruent.

7. The apparatus of claim 1, wherein the first triangle and the second triangle are symmetric to each other about a diagonal line crossing the grating region.

8. The apparatus of claim 1, wherein:
the 2D grating is configured for receiving an incident light from an optical fiber with an incident angle that is non-zero;
the incident angle is measured in plane of incidence between an axis of the optical fiber and a direction perpendicular to the planar layer; and
the first length, the second length, the first distance and the second distance are determined based on the incident angle and a position of the optical fiber relative to the 2D grating.

9. The apparatus of claim 8, wherein:
the first taper structure is configured for transmitting a first portion of the incident light to the first waveguide to achieve a minimum insertion loss; and
the second taper structure is configured for transmitting a second portion of the incident light to the second waveguide to achieve a minimum insertion loss, wherein
the first portion of the incident light is substantially a parallel polarization component of the incident light,
the second portion of the incident light is substantially an orthogonal polarization component of the incident light,
each of the parallel polarization component and the orthogonal polarization component comprises a polarized light, and
the polarized light has a transverse magnetic (TM) polarization mode or a transverse magnetic (TE) polarization mode split from the incident light.

10. The apparatus of claim 1, wherein:
each of the first length and the second length is between 20 and 500 micrometers; and
each of the first distance and the second distance is between 0 and 20 micrometers.

11. A two-dimensional (2D) grating coupler, comprising:
a planar layer;
a grating region comprising an array of scattering elements arranged in the planar layer to form a 2D grating;
a first taper structure in the planar layer connecting a first side of the grating region to a first waveguide, wherein a shape of the first taper structure is a first triangle that is asymmetric about any line perpendicular to the first side of the grating region in the planar layer; and
a second taper structure in the planar layer connecting a second side of the grating region to a second waveguide, wherein a shape of the second taper structure is a second triangle that is asymmetric about any line perpendicular to the second side of the grating region in the planar layer, wherein the first side and the second side are substantially perpendicular to each other such that each of the first taper structure and the second taper structure has a shape and dimensions to reduce light power loss due to light transmission and reflection with respect to the 2D grating, wherein:
the array of scattering elements are evenly distributed in the planar layer such that there is a same distance between centers of every two adjacent scattering elements along either a first direction perpendicular to the first side of the grating region or a second direction perpendicular to the second side of the grating region,
the first triangle has a first base side residing on the first side of the grating region, has a first vertex opposite to the first base side, and has a first length along the first direction, and
the first vertex has a first distance to a perpendicular bisector of the first base side in the planar layer,
the second triangle has a second base side residing on the second side of the grating region, has a second vertex opposite to the second base side, and has a second length along the second direction,
the second vertex has a second distance to a perpendicular bisector of the second base side in the planar layer,
the first distance and the second distance are equal to each other,
the first taper structure is configured for transmitting a first portion of the incident light to the first waveguide to achieve a minimum insertion loss, and the second taper structure is configured for transmitting a second portion of the incident light to the second waveguide to achieve a minimum insertion loss, wherein the first portion of the incident light is substantially a parallel polarization component of the incident light, and the second portion of the incident light is substantially an orthogonal polarization component of the incident light.

12. The 2D grating coupler of claim 11, wherein:
a shape of the first taper structure is a first triangle that is asymmetric about any line perpendicular to the first side of the grating region in the planar layer;
a shape of the second taper structure is a second triangle that is asymmetric about any line perpendicular to the second side of the grating region in the planar layer; and
the first side and the second side are substantially perpendicular to each other.

13. The 2D grating coupler of claim 12, wherein:
the first triangle has a first length from a first base side residing on the first side to a first vertex opposite the first base side, and has a first shift from the first vertex to a perpendicular bisector of the first base side; and
the second triangle has a second length from a second base side residing on the second side to a second vertex opposite the second base side, and has a second shift from the second vertex to a perpendicular bisector of the second base side.

14. The 2D grating coupler of claim 13, wherein:
the first length, the second length, the first shift and the second shift have values to maximize light power in the first waveguide and the second waveguide.

15. The 2D grating coupler of claim 14, wherein:
the values of the first length and the second length are between 20 and 500 micrometers; and
the values of the first shift and the second shift are between 0 and 20 micrometers.

16. An apparatus for optical coupling, comprising:
a planar layer;
a grating region comprising an array of scattering elements arranged in the planar layer to form a two-dimensional (2D) grating;
a first taper structure formed in the planar layer connecting a first side of the grating region to a first waveguide, wherein a shape of the first taper structure is a first triangle that is asymmetric about any line perpendicular to the first side of the grating region in the planar layer; and
a second taper structure formed in the planar layer connecting a second side of the grating region to a second waveguide, wherein a shape of the second taper structure is a second triangle that is asymmetric about any line perpendicular to the second side of the grating region in the planar layer, wherein the first side and the second side are substantially perpendicular to each other, wherein:
the array of scattering elements are evenly distributed in the planar layer such that there is a same distance between centers of every two adjacent scattering elements along either a first direction perpendicular to the first side of the grating region or a second direction perpendicular to the second side of the grating region,
the first triangle has a first base side residing on the first side of the grating region, has a first vertex opposite to the first base side, and has a first length along the first direction, and
the first vertex has a first distance to a perpendicular bisector of the first base side in the planar layer,
the second triangle has a second base side residing on the second side of the grating region, has a second vertex opposite to the second base side, and has a second length along the second direction,
the second vertex has a second distance to a perpendicular bisector of the second base side in the planar layer,
the first distance and the second distance are equal to each other,
the 2D grating is configured for receiving an incident light from an optical fiber with an incident angle that is non-zero,
the incident angle is measured in plane of incidence between an axis of the optical fiber and a direction perpendicular to the planar layer, and
the first length, the second length, the first distance and the second distance are determined based on the incident angle and a position of the optical fiber relative to the 2D grating.

17. The apparatus of claim 16, wherein:
the first taper structure is configured for transmitting a first portion of the incident light to the first waveguide to achieve a minimum insertion loss; and
the second taper structure is configured for transmitting a second portion of the incident light to the second waveguide to achieve a minimum insertion loss, wherein the first portion of the incident light is substantially a parallel polarization component of the incident light, and the second portion of the incident light is substantially an orthogonal polarization component of the incident light.

18. The apparatus of claim 17, wherein each of the parallel polarization component and the orthogonal polarization component comprises a polarized light.

19. The apparatus of claim 18, wherein the polarized light has a transverse magnetic (TM) polarization mode or a transverse magnetic (TE) polarization mode split from the incident light.

20. The apparatus of claim 16, wherein:
each of the first length and the second length is between 20 and 500 micrometers; and
each of the first distance and the second distance is between 0 and 20 micrometers.

* * * * *